(12) United States Patent
Altamura et al.

(10) Patent No.: US 10,738,874 B2
(45) Date of Patent: Aug. 11, 2020

(54) ASSEMBLING PROCESS FOR MOUNTING A ROLLING BEARING ON A GEAR SHAFT, AND GEAR ASSEMBLY OBTAINABLE BY SUCH A PROCESS

(71) Applicant: GE AVIO SRL, Rivalta di Torino (IT)

(72) Inventors: Paolo Altamura, Brindisi (IT); Salvatore Percacciolo, Rivalta di Torino (IT); Leonardo Orlando, Rivalta di Torino (IT); Marco Maffiotto, Rivalta di Torino (IT)

(73) Assignee: GE AVIO SRL, Rivalta di Torino (IT)

( * ) Notice: Subject to any disclaimer, the term of this patent is extended or adjusted under 35 U.S.C. 154(b) by 634 days.

(21) Appl. No.: 15/381,545

(22) Filed: Dec. 16, 2016

(65) Prior Publication Data

US 2017/0175872 A1    Jun. 22, 2017

(51) Int. Cl.
*F16H 57/00* (2012.01)
*F16H 57/023* (2012.01)
(Continued)

(52) U.S. Cl.
CPC ..... *F16H 57/0025* (2013.01); *F16C 33/4623* (2013.01); *F16C 33/581* (2013.01);
(Continued)

(58) Field of Classification Search
CPC .... F16H 57/0025; F16H 55/17; F16H 57/023; F16H 57/0018; F16C 43/065;
(Continued)

(56) References Cited

U.S. PATENT DOCUMENTS 2,174,262 A    9/1939   Griswold
2,438,542 A    3/1948   Cushman
(Continued)

FOREIGN PATENT DOCUMENTS

CN    1143721 A    2/1997
CN    103717944 A    4/2014
(Continued)

OTHER PUBLICATIONS

Machine Translation andCopy of First Office Action and Search issued in connection with corresponding CN Application No. 201611199201.4 dated Dec. 4, 2018 (Office Action translation is not available).

(Continued)

*Primary Examiner* — David P Bryant
*Assistant Examiner* — Darrell C Ford
(74) *Attorney, Agent, or Firm* — McGarry Bair PC

(57) ABSTRACT

A rolling bearing is mounted on a gear shaft, which extends along an axis and carries a first and a second toothing axially separated from each other by a cylindrical portion of the gear shaft. Such a cylindrical portion has an outer diameter smaller than that of the first toothing. The bearing is provided with rolling bodies, a cage with seats engageable by the rolling bodies, and an outer ring defining an outer rolling path for the rolling bodies. During assembly, the cage is fitted around the first toothing and axially displaced towards the second toothing until it is arranged around the cylindrical portion. In this step, the tenons of the cage pass in the slots between the teeth of the first toothing. Subsequently, the rolling bodies are radially inserted in the respective seats so as to be arranged against the cylindrical portion.

13 Claims, 4 Drawing Sheets

(51) Int. Cl.
| | | |
|---|---|---|
| *F16C 33/58* | (2006.01) | |
| *F16C 33/46* | (2006.01) | |
| *F16C 43/06* | (2006.01) | |
| *F16H 55/17* | (2006.01) | |
| *F16C 19/26* | (2006.01) | |
| *F16C 33/60* | (2006.01) | |
| *F16C 43/08* | (2006.01) | |
| *F16C 19/56* | (2006.01) | |

(52) U.S. Cl.
CPC .......... *F16C 43/065* (2013.01); *F16C 43/083* (2013.01); *F16H 55/17* (2013.01); *F16H 57/023* (2013.01); *F16C 19/26* (2013.01); *F16C 19/56* (2013.01); *F16C 33/60* (2013.01); *F16C 2361/61* (2013.01)

(58) Field of Classification Search
CPC .. F16C 2361/61; F16C 33/4623; F16C 19/26; F16C 19/56; F16C 33/60; F16C 43/083; F16C 33/581; Y10T 29/49636; Y10T 29/49643; Y10T 29/49679; Y10T 29/4968; Y10T 29/49689; Y10T 29/49696; Y10T 29/49826
USPC ........... 29/428, 898.07, 898, 898.04, 898.06, 29/898.061, 898.062
See application file for complete search history.

(56) References Cited

U.S. PATENT DOCUMENTS

| | | | |
|---|---|---|---|
| 2,943,894 A | 7/1960 | Brook | |
| 3,792,625 A | 2/1974 | Asberg | |
| 4,129,050 A * | 12/1978 | Akashi | ...................... F16H 3/66 29/437 |
| 4,999,913 A | 3/1991 | Kawachi | |
| 5,325,599 A * | 7/1994 | Russell | ................ F16C 19/364 33/517 |
| 6,397,471 B1 * | 6/2002 | Okuno | .................... F16C 19/14 29/724 |
| 6,796,031 B1 * | 9/2004 | Russell | ................ F16C 19/364 29/407.02 |
| 8,375,819 B2 * | 2/2013 | Christ | .................... F16H 55/17 74/412 R |
| 8,393,081 B2 | 3/2013 | Doeppling et al. | |
| 2004/0060380 A1 * | 4/2004 | Christ | .................... F16H 55/17 74/421 A |
| 2004/0177509 A1 * | 9/2004 | Russell | ................ F16C 19/364 29/898.062 |
| 2005/0160848 A1 * | 7/2005 | Thiessen | ............... F16H 3/0915 74/325 |
| 2006/0117567 A1 | 6/2006 | Leimann | |
| 2007/0160419 A1 * | 7/2007 | Breitenbach | .......... B25B 27/023 403/337 |
| 2008/0260317 A1 * | 10/2008 | Earthrowl | ............... F16C 19/26 384/577 |
| 2010/0202721 A1 * | 8/2010 | Fukuda | ................. F16C 19/182 384/548 |
| 2012/0167391 A1 | 7/2012 | Werner | |
| 2016/0153494 A1 | 6/2016 | Kullin | |

FOREIGN PATENT DOCUMENTS

| | | |
|---|---|---|
| CN | 104728272 A | 6/2015 |
| DE | 32 17 793 A1 | 11/1983 |
| DE | 3217793 A1 | 11/1983 |
| DE | 10 2011 006 599 A1 | 10/2012 |
| DE | 102011006599 A1 | 10/2012 |
| JP | H08-184319 A | 7/1996 |
| JP | 2006-038088 A | 2/2006 |
| JP | 2009-243609 A | 10/2009 |

OTHER PUBLICATIONS

Copy of Extended European Search Report and Opinion issued in connection with corresponding EP Application No. 16205846.5 dated Jun. 1, 2017.

Machine Translation and Copy of Notification of Reasons for Refusal issued in connection with corresponding JP Application No. 2016-238080 dated Jan. 9, 2018.

* cited by examiner

ASSEMBLING PROCESS FOR MOUNTING A ROLLING BEARING ON A GEAR SHAFT, AND GEAR ASSEMBLY OBTAINABLE BY SUCH A PROCESS

BACKGROUND

Embodiments of the present invention relate to an assembling process for mounting a rolling bearing on a gear shaft. Gears having a shaft and two toothings which are axially distanced from each other and connected to each other by an intermediate portion of such shaft are well known. Gears of this type are coupled to a supporting structure by means of a pair of rolling bearings, which are mounted on opposite ends of the shaft, with two toothings arranged in intermediate positions between the bearings.

The need is felt to provide a gear which is more compact in the axial direction, in particular for applications in which it is used as planet gear in an epicyclic transmission.

BRIEF DESCRIPTION

It is the object of the present invention to provide an assembling process for mounting a rolling bearing on a gear shaft, which makes it possible to satisfy the need illustrated above in simple and cost-effective manner.

According to embodiments of the present invention, an assembling process for mounting a rolling bearing on a gear shaft is provided.

According to embodiments of the present invention, a gear assembly, provided with a gear and a rolling bearing, is also provided.

BRIEF DESCRIPTION OF THE DRAWINGS

Embodiments of the present invention will now be described with reference to the accompanying drawings which illustrate a non-limitative embodiment thereof, in which.

DETAILED DESCRIPTION

Figure 1:
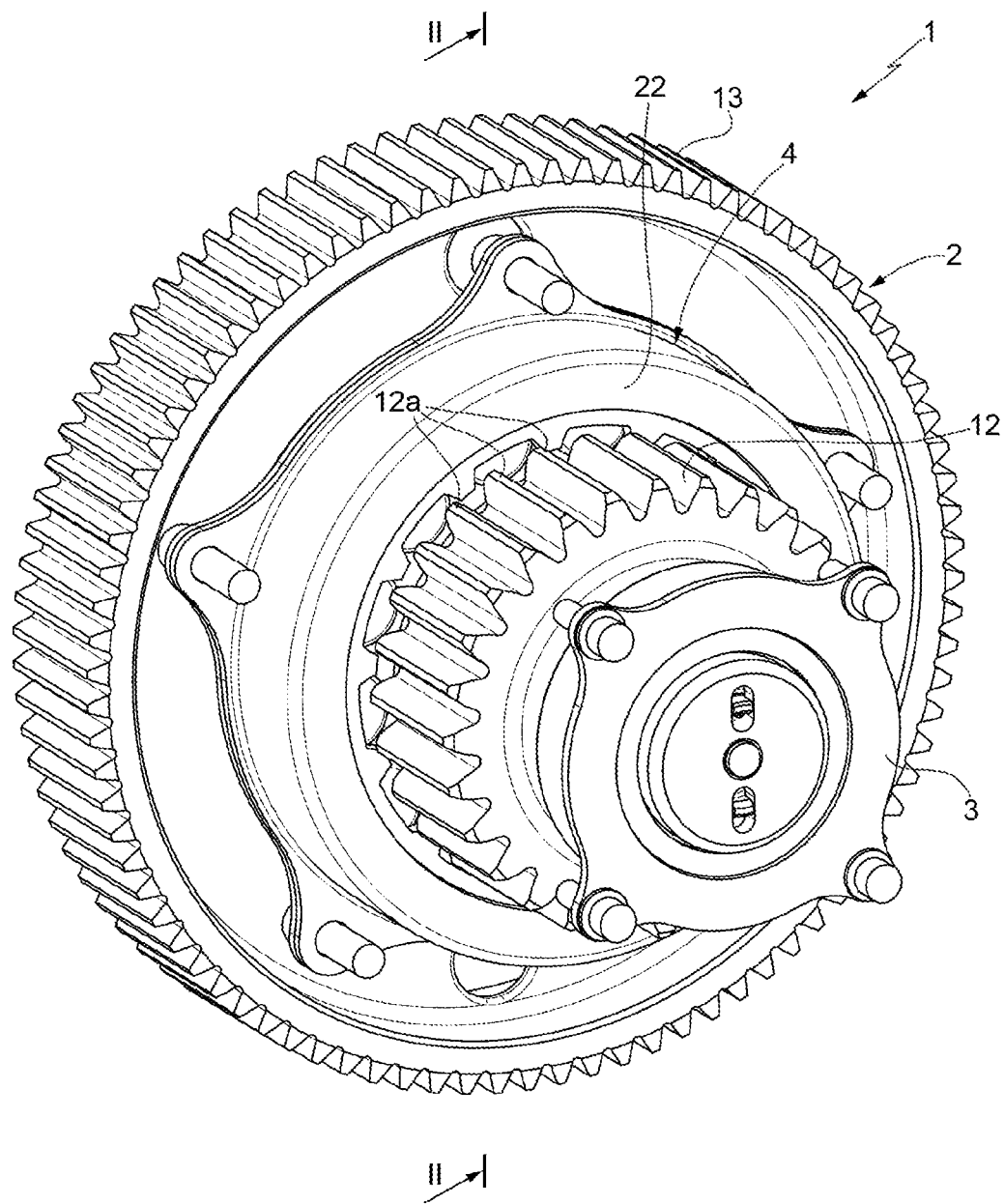
FIG. 1 is a perspective view of a gear assembly according to an embodiment of the present invention.

In FIG. 1, reference numeral 1 indicates a gear assembly consisting of a gear or toothed wheel 2 and of two rolling bearings 3 and 4. In an embodiment, the toothed wheel 2 defines a planet gear in an epicyclic transmission (not shown).

Figure 2:
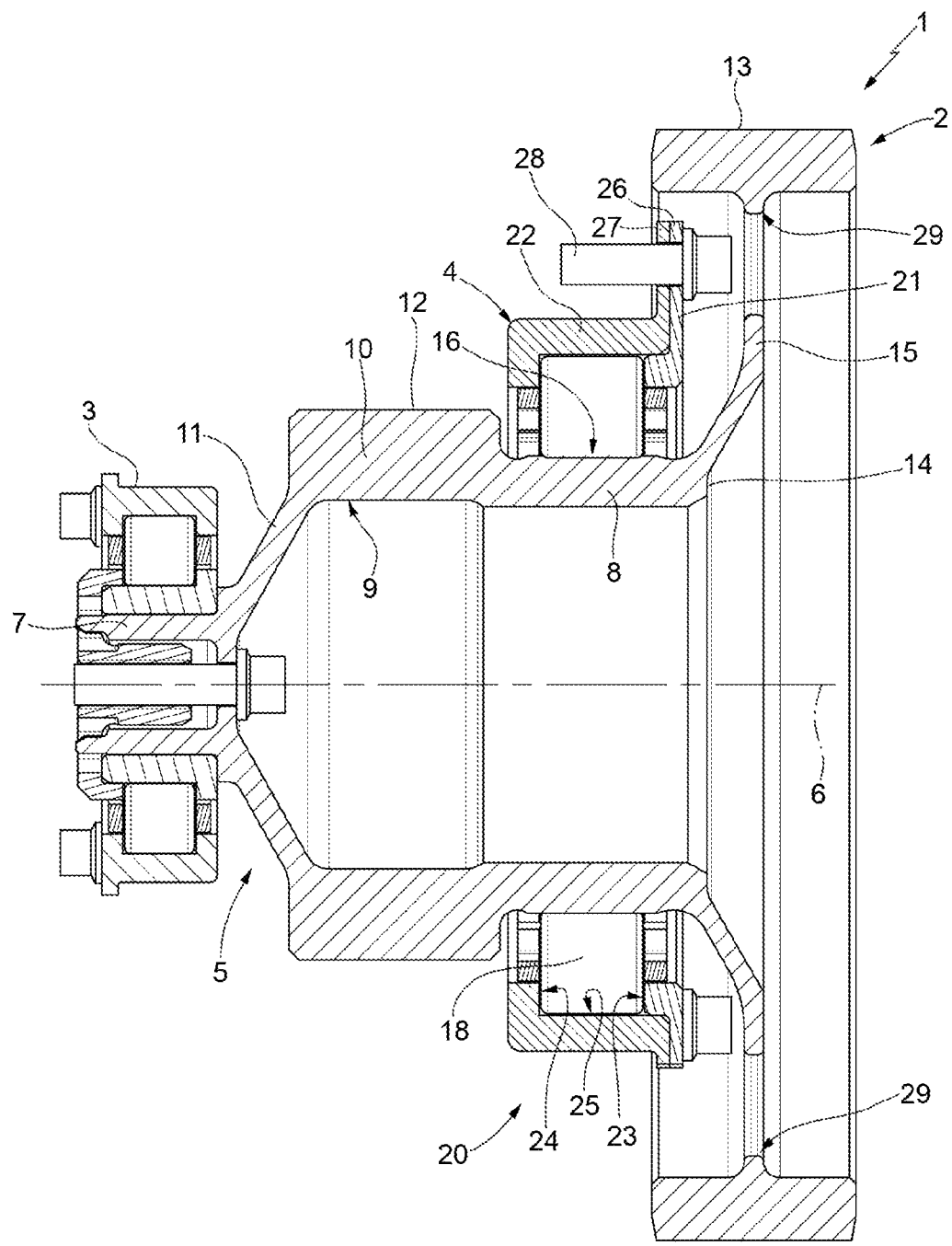
FIG. 2 is a section taken along a meridian section plane identified by line II-II in FIG. 1.

As shown in FIG. 2, the toothed wheel 2 is defined by a single part and not by parts fixed to one another, and comprises of a pin or shaft 5, which extends along an axis 6. The shaft 5 comprises of two cylindrical portions 7 and 8 on which are mounted, respectively, bearings 3 and 4. The shaft 5 further includes an intermediate portion 9, which is arranged between the portions 7,8 and includes a cylindrical stretch 10 and a frustoconical stretch 11 which connects the stretch 10 to the portion 7 and has decreasing radius towards portion 7.

The toothed wheel 2 further includes two outer toothings, 12 and 13, which are axially distanced from each other and connected to each other by portion 8, and are specifically defined by straight teeth.

According to an aspect of the present invention, the toothing 13 is arranged on an end of the shaft 5, and thus is arranged overhanging with respect to the support defined by the bearing 3. In particular, the toothing 13 is connected to an axial end 14 of the portion 8 by means of an annular flange 15.

In particular, the toothing 12 is made directly on the stretch 10, without any intermediate flange between the toothing 12 and the shaft 5. Therefore, the toothing 12 has a smaller diameter than the toothing 13 and is axially aligned with the flange 15.

The portion 8 has an outer surface 16, which is cylindrical and has an outer diameter smaller than that of the toothing 12, and thus defines an undercut with respect to the toothing 12. In an embodiment, the surface 16 directly defines an inner rolling path for the rolling bodies of the bearing 4, which is thus free from inner ring. In particular, such rolling bodies are defined by rollers 18.

The bearing 4 further comprises an outer ring 20, consisting of two annular bodies 21 and 22, which are coaxial, fixed to each other and have respective axial shoulders 23 and 24 which are arranged on opposite axial parts of the rollers 18. The inner diameter of the shoulders 23 and 24 is greater than the outer diameter of the teeth 12a of the toothing 12 (FIG. 1).

The body 21 is closest to the flange 15, while the body 22 defines an outer rolling path 25 for the rollers 18. For the mutual fixing, the bodies 21 and 22 feature specifically outer radial protrusions 26 and 27, which are fixed to each other by means of screws or bolts 28. The flange 15 is provided with at least one hole 29, obtained at the same radius as the screws 28, to allow the fastening thereof.

Figure 3:
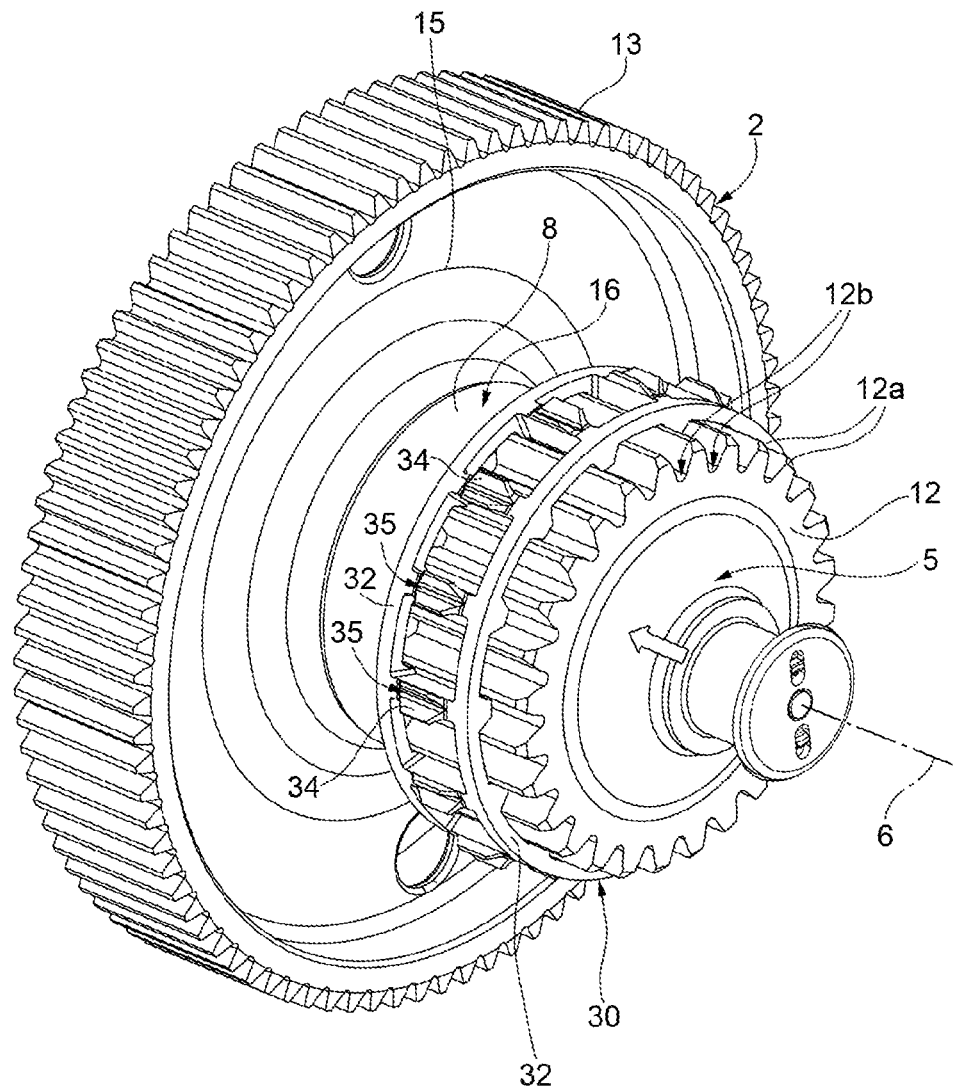
FIG. 3 is a perspective view of the gear assembly of FIG. 1, further illustrating a step of the assembling process in accordance with various aspects described herein.

Finally, as shown in FIG. 3, bearing 4 comprises a cage 30, the size and shape of which is such to be able to be axially fitted around the toothing 12 and axially displaced without interference to reach portion 8 during the assembly process. In particular, the cage 30 presents two circular rings 32, which are coaxial and axially distanced and have an inner diameter which is greater than the outer diameter of the teeth 12a. The cage 30 further comprises a plurality of tenons or arms 34, which are parallel to the axis 6, connect the rings 32 to each other and are equally distanced around the axis 6 so as to define the sides of a plurality of seats 35.

Figure 4:
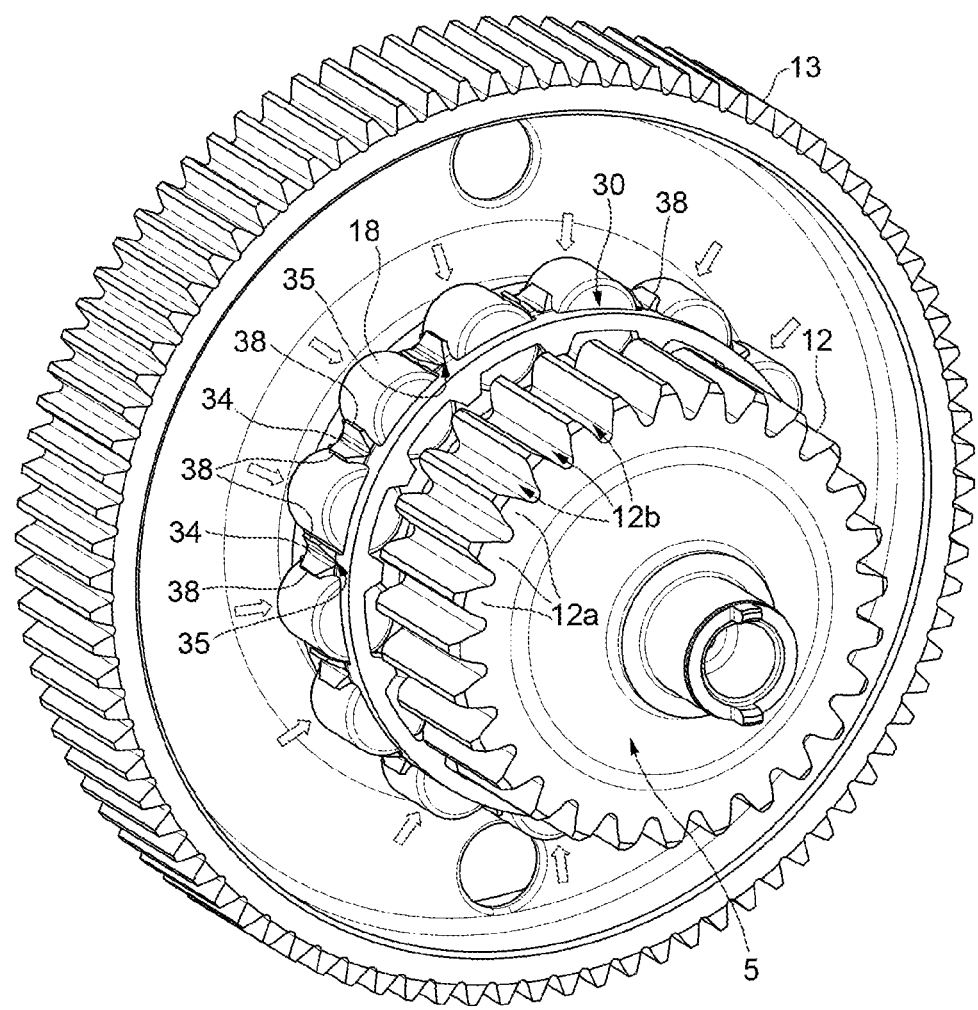
FIG. 4 is a perspective view of the gear assembly of FIG. 1, further illustrating another step of the assembly in accordance with various aspects described herein.

As shown in FIG. 4, each roller 18 is housed in its respective seat 35 and retained in such seat 35 by tabs 38, which radially protrude towards the outside from the arms 34. In particular, the dimension of the arms 34 defines an inner diameter which is smaller than the outer diameter of the teeth 12a, so that the arms 34 radially protrude towards the inside with respect to the circular profile of the rings 32. According to an aspect of the present invention, the number of the arms 34 is either a sub-multiple or is equal to that of the slots 12b; moreover, the dimensions of the arms 34 is smaller than that of the slots 12b, which are envisaged between the teeth 12a in circumferential direction. In other words, with respect to axis 6, the inner diameter of the arms 34 is broader than the position of the bottom of the slots 12b; and the size of the arms 34 in circumferential direction is narrower than the distance between adjacent teeth 12a. In this manner, during assembly, when the cage 30 is made to slide axially towards the portion 8, as shown in FIG. 3, the arms 34 axially pass through the slots 12b without interference.

Furthermore, the arms or tenons 34 are designed so as to have the necessary structural strength and to guarantee the correct positioning of the rollers 18 at the end of the assembly. In particular, the arms 34 are designed so as to maximize the contact surface with the rollers 18, in the sense of the rolling direction. Furthermore, the center of the arms 24 is positioned, with respect to the axis 6, at a radius which is substantially equal to that in which the centers of the rollers 18 are positioned.

The assembling process requires first of all the axial fitting of body 21 and then of cage 30 until these two components are arranged around the portion 8, i.e. axially beyond the toothing 12. After these operations, the rollers 18 are inserted radially from the outside inwards in the respective seats 35 so as to lay them onto the surface 16, as shown in FIG. 4. After inserting each roller 18, the two tabs 38, which are adjacent, are bent by means of plastic deformation, e.g. by riveting, so as to lay onto the roller 18 itself. Therefore, by means of such bending, the tabs 38 retain the roller 18 in the corresponding seat 35 against the surface 16.

After having mounted all the rollers 35 in the cage 30, the body 22 is axially fitted around the toothing 12 and then axially moved so as to be arranged around the rollers 18, until it axially couples the shoulder 24 against the rollers 18 and the protrusions 27 against the protrusions 26. At this point, the protrusions 26 and 27 are fixed to each other in order to define the outer ring 20 of the bearing 4.

The features and the assembly method of the bearing 3 are well known and thus not described in detail.

From the above, it is apparent that the proposed solution makes it possible to mount the bearing 4 at an undercut of the toothed wheel 2, so that it is possible to make a shaft 5 of shorter length than the known solutions, in which the two bearings are arranged at the ends of the shaft, on opposite axial parts of the two toothings.

The suggested solution is then relatively simple and has a relatively low number of components. In all cases, the conformation of the arms 34 described above makes it possible to design the cage 30 so as to satisfy the necessary requirements of strength and reliability.

From the above, it is apparent that changes and variations may be made to the assembling process and to the assembly 1 described above, with reference to the accompanying figures, without departing from the scope of protection of the appended claims.

In particular, the cage 30 could consist of multiple parts, fixed to each other during the assembling process: for example, one of the two rings 32 could belong to a part separated from the arms 34 and fixed to them.

Furthermore, the rolling bodies of the bearing 4 could be retained in the respective seats 35 of the cage 30 in a different way from what described above by way of example: for example, such rolling bodies could be coupled by snapping into the seats 35 during their radial insertion without needing a plastic deformation of the cage 30.

The outer ring 20 could be made differently; and/or the toothed wheel 2 could be made of separate parts which are fixed to each other before mounting the bearing 4 on the portion 8.

It is to be understood that even though numerous characteristics and advantages of various embodiments have been set forth in the foregoing description, together with details of the structure and functions of various embodiments, this disclosure is illustrative only, and changes may be made in detail, especially in matters of structure and arrangement of parts within the principles of the embodiments to the full extent indicated by the broad general meaning of the terms in which the appended claims are expressed. It will be appreciated by those skilled in the art that the teachings disclosed herein can be applied to other systems without departing from the scope and spirit of the application.

The invention claimed is:

1. An assembling process for mounting a rolling bearing on a gear shaft, which extends along an axis and carries a first toothing and a second toothing, axially separated one from the other by a cylindrical portion of the gear shaft; the cylindrical portion having an outer diameter smaller than that of the first toothing; the bearing comprising a plurality of rolling bodies; a cage defining a plurality of seats each engageable by a respective rolling body of the plurality of rolling bodies wherein the cage comprises a plurality of arms, which delimit the seats in a circumferential direction and run axially through a plurality of slots between a plurality of teeth of the first toothing when the cage is fitted; an outer ring defining an outer rolling path for the plurality of rolling bodies; the process comprising the following steps:

fitting the cage around the first toothing and moving the cage axially towards the second toothing until the cage is arranged around the cylindrical portion; and inserting the respective rolling body radially in the respective seats after having fitted the cage.

2. The process according to claim 1, wherein the plurality of rolling bodies are inserted in the seats so as to be arranged in abutment onto an outer surface of the cylindrical portion, which defines an inner rolling path for the plurality of rolling bodies.

3. The process according to claim 1, wherein the outer ring comprises a first and a second body, coaxial with each other, the process further comprising:

fitting the first body around the first toothing and axially towards the second toothing, before fitting the cage;

fitting the second body around the first toothing and axially towards the second toothing after having inserted the plurality of rolling bodies into the seats; and fixing the second body to the first body.

4. The assembly process of claim 1, wherein the cage comprises, for each arm, two respective tabs which radially protrude towards the outside from the arm so as to retain the plurality of rolling bodies in the respective seats.

5. The assembly process of claim 1, wherein the outer ring comprises two annular bodies, which are coaxial and fixed one with respect to the other and have respective shoulders arranged from opposite axial sides of the plurality of rolling bodies.

6. The assembly process of claim 5, wherein the annular bodies comprises respective outer radial protrusions fixed to each other with screws or bolts.

7. The assembly process of claim 6, wherein the second toothing is connected to the gear shaft with a flange, which is provided with at least one through hole and made at the same radius in which the screws or bolts are provided.

8. The assembly process of claim 1, wherein the cylindrical portion has an outer cylindrical surface defining an inner rolling path for the plurality of rolling bodies.

9. The assembly process of claim 1, wherein the gear shaft forms at least a portion of a toothed wheel defined by a single piece.

10. The assembly process of claim 1, wherein the second toothing is arranged at one axial end of the gear shaft.

11. An assembling process for mounting a rolling bearing on a gear shaft, which extends along an axis and carries a first toothing and a second toothing, axially separated one from the other by a cylindrical portion of the gear shaft; the cylindrical portion having an outer diameter smaller than that of the first toothing; the bearing comprising a plurality of rolling bodies; a cage defining a plurality of seats each engageable by a respective rolling body of the plurality of rolling bodies; an outer ring defining an outer rolling path for the plurality of rolling bodies wherein the outer ring comprises a first body and a second body, coaxial with each other; the process comprising the following steps:

fitting the cage around the first toothing and moving the cage axially towards the second toothing until the cage is arranged around the cylindrical portion; and inserting the respective rolling body radially in the respective seats after having fitted the cage; the process further comprising:

fitting the first body around the first toothing and axially towards the second toothing, before fitting the cage;

fitting the second body around the first toothing and axially towards the second toothing after having inserted the plurality of rolling bodies into the seats; and fixing the second body to the first body.

12. The process according to claim 11, wherein the cage comprises a plurality of arms, which delimit the seats in a circumferential direction and run axially through a plurality of slots between a plurality of teeth of the first toothing when the cage is fitted.

13. The process according to claim 11, wherein the plurality of rolling bodies are inserted in the seats so as to be arranged in abutment onto an outer surface of the cylindrical portion, which defines an inner rolling path for the plurality of rolling bodies.

* * * * *